(12) United States Patent
Hung et al.

(10) Patent No.: US 7,829,652 B2
(45) Date of Patent: Nov. 9, 2010

(54) POLYARYLETHER COMPOSITION AND MEMBRANE

(75) Inventors: Joyce Hung, Auburn, AL (US); Daniel Joseph Brunelle, Burnt Hills, NY (US); Marianne Elisabeth Harmon, Redondo Beach, CA (US); David Roger Moore, Albany, NY (US); Joshua James Stone, Worcester, NY (US); Hongyi Zhou, Niskayuna, NY (US); Joseph Anthony Suriano, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/183,488

(22) Filed: Jul. 31, 2008

(65) Prior Publication Data

US 2010/0029864 A1   Feb. 4, 2010

(51) Int. Cl.
*C08G 2/00*   (2006.01)
(52) U.S. Cl. ............... 528/220; 528/373; 528/391
(58) Field of Classification Search .......... 525/535, 525/471
See application file for complete search history.

(56) References Cited

U.S. PATENT DOCUMENTS

| 4,419,486 A | 12/1983 | Rose |
|---|---|---|
| 4,767,837 A | 8/1988 | Jansons |
| 4,990,252 A | 2/1991 | Tomaschke et al. |
| 2006/0134494 A1 | 6/2006 | Shin et al. |
| 2007/0142614 A1 * | 6/2007 | Hung et al. ............ 528/220 |

OTHER PUBLICATIONS

Dae Sik Kim, Gilles P. Robertson, and Michael D. Guiver, "Comb-Shaped Poly(Arylene Ether Sulfone)s as Proton Exchange Membranes"; Institute for Chemical Process and Environmental Technology, National Research Council, 1200 Montreal Road, Ottawa, Ontario K1A 0R6, Canada; Web Release Date: Feb. 23, 2008; Macromolecules, 41 (6), 2126-2134, 2008.

* cited by examiner

*Primary Examiner*—Randy Gulakowski
*Assistant Examiner*—Kyle Baumstein
(74) *Attorney, Agent, or Firm*—Mary Louise Gioeni

(57) ABSTRACT

A composition including a polyarylether copolymer is provided. The copolymer includes a polyarylether backbone; and a sulfonated oligomeric group bonded to the polyarylether suitable for use as a cation conducting membrane. Method of bonding a sulfonated oligomeric group to the polyarylether backbone to form a polyarylether copolymer. The membrane may be formed from the polyarylether copolymer composition. The chain length of the sulfonated oligomeric group may be controlled to affect or control the ion conductivity of the membrane.

23 Claims, No Drawings

POLYARYLETHER COMPOSITION AND MEMBRANE

STATEMENT OF FEDERALLY FUNDED RESEARCH

This invention was made with Government support under contract number DE-FG36-06GO16034 awarded by the Department of Energy. The Government has certain rights in the invention.

BACKGROUND

1. Technical Field

The invention includes embodiments that relate to a polyarylether composition. The invention includes embodiments that relate to a cation conducting membrane and method of making the cation conducting membrane for fuel cell or water purification applications.

2. Discussion of Art

Interest in using fuel cells as a clean, alternative power source has driven years of research in polymer electrolyte membrane (PEM) fuel cell development to meet the cost and performance targets for automotive and portable applications. Current PEM fuel cells may use NAFION® brand membrane, or another perfluorosulfonic acid polymer membrane. However, the widespread use of these membranes has been limited by their cost and performance at low relative humidities (RH). Therefore, alternative low-cost membrane materials that have better performance in less humidified conditions may be desired.

It may be desirable to have a composition or membrane with properties and characteristics that differ from those properties of currently available compositions or membranes. It may be desirable to have a method that differs from those methods currently available.

BRIEF DESCRIPTION

In one embodiment, composition includes a polyarylether copolymer. The copolymer includes a polyarylether backbone; and a sulfonated oligomeric group bonded to the polyarylether backbone. The polyarylether copolymer has a chemical structure as shown in formula 1.

-[(T-A-T-B)$_x$-]-[(T-A-T-D)$_y$-]-      (Formula 1)

wherein,

T is independently O or S or a combination thereof,

-A- is

or a $C_1$-$C_{20}$ aliphatic diradical, or a $C_3$-$C_{40}$ aromatic diradical, or a $C_4$-$C_{20}$ cycloaliphatic diradical, or a $C_3$-$C_{40}$ heterocycle diradical, or

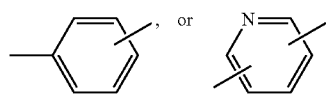

wherein Y is independently a direct bond or O, S, $(CH_2)_r$, $(CF_2)_r$, $C(CH_3)_2$, $C(CF_3)_2$, or a combination thereof;

$R^1$ is independently $C_1$-$C_{10}$ alkyl, $C_3$-$C_{12}$ cycloalkyl, $C_6$-$C_{14}$ aryl, allyl, alkenyl, alkoxy, halo, cyano, nitro, or perfluorinated alkyl, such as trifluoromethyl;

r is an integer from 1 to 5;

a is independently 0 or an integer from 1 to 4.

—B— is

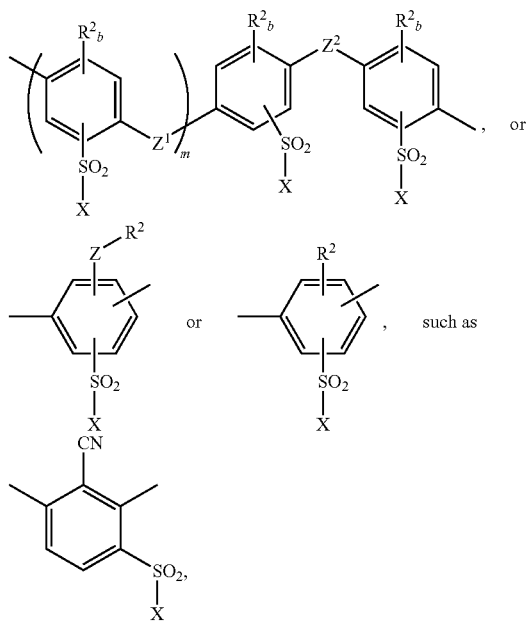

wherein, Z, $Z^1$, $Z^2$ is a direct bond, CO, $SO_2$, a $C_1$-$C_{20}$ aliphatic diradical, a $C_3$-$C_{40}$ aromatic diradical, or a $C_4$-$C_{20}$ cycloaliphatic diradical;

$R^2$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

m is independently 0 or an integer from 1 to 4;

b is independently 0 or an integer from 1 to 3;

X is OM, wherein M is H, a metal cation, a non-metallic inorganic cation, an organic cation or a mixture thereof; or X is

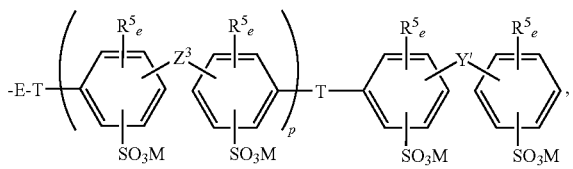

wherein, $Z^3$ is a bond, CO, $SO_2$, a $C_1$-$C_{20}$ aliphatic diradical, a $C_3$-$C_{40}$ aromatic diradical, or a $C_4$-$C_{20}$ cycloaliphatic diradical;

$R^5$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

e is independently 0 or an integer from 1 to 3;

T is independently O or S or a combination thereof;

p and r are integers from 1 to 5;

Y' is independently a direct bond or O, S, $(CH_2)_r$, $(CF_2)_r$, $C(CH_3)_2$, $C(CF_3)_2$, or a combination thereof;

E is an amine-containing aromatic diradical, aliphatic diradical or cycloaliphatic diradical and the nitrogen is bound as a sulfonamide to the polymer backbone,

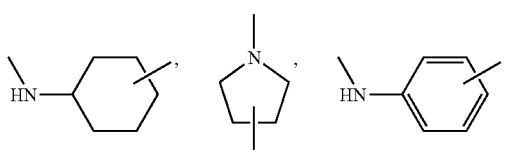

-D- is

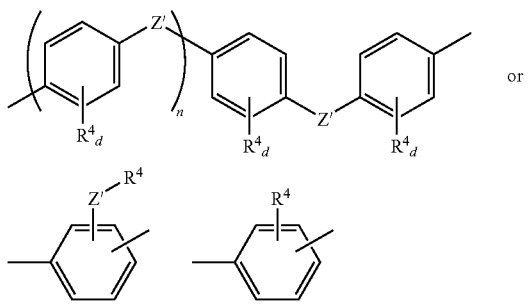

and wherein,

R$^4$ is independently C$_1$-C$_{10}$ alkyl, C$_3$-C$_{12}$ cycloalkyl, C$_6$-C$_{14}$ aryl, allyl, alkenyl, alkoxy, halo, nitro, perfluorinated alkyl, such as trifluoromethyl, or cyano;

d and n are independently 0 or an integer from 1 to 4;

Z' is a direct bond, CO, SO$_2$, a C$_1$-C$_{20}$ aliphatic diradical, a C$_3$-C$_{40}$ aromatic diradical, or a C$_4$-C$_{20}$ cycloaliphatic diradical;

x and y are the repeat units may be from 0 to 500 with a random or block arrangement in the polymer microstructure.

One embodiment has a representative structure of the polyarylether copolymer which is also a sulfonated graft copolymer, either block or randomly distributed block lengths, as shown in formula 2.

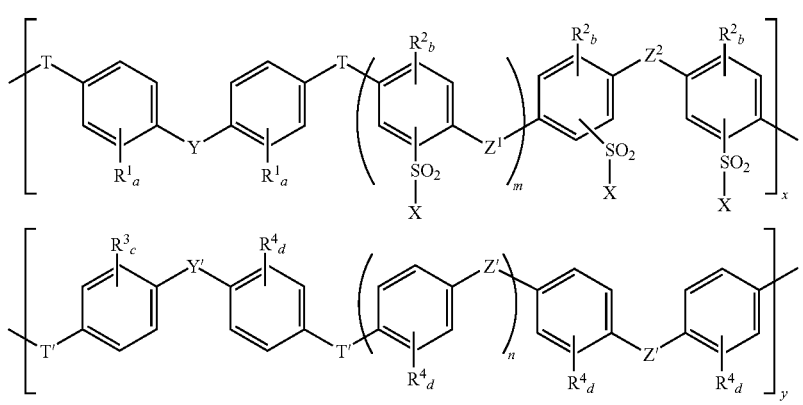

(Formula 2)

wherein,

T and T' are independently O or S or a combination thereof,

Also, Y and Y' are independently a direct bond or O, S, (CH$_2$)$_r$, (CF$_2$)$_r$, C(CH$_3$)$_2$, C(CF$_3$)$_2$, or a combination thereof;

R$^1$, R$^2$, R$^3$, and R$^4$ are independently C$_1$-C$_{10}$ alkyl, C$_3$-C$_{12}$ cycloalkyl, C$_6$-C$_{14}$ aryl, allyl, alkenyl, alkoxy, halo, perfluorinated alkyl, such as trifluoromethyl, or cyano;

Z$^1$, Z$^2$, or Z' is a bond, CO, SO$_2$, a C$_1$-C$_{20}$ aliphatic radical, a C$_3$-C$_{40}$ aromatic radical, or a C$_4$-C$_{20}$ cycloaliphatic radical;

a, c, e, m, and n are independently 0 or an integer from 1 to 4;

x and y are the repeat units may be from 0 to 500 with a random or block arrangement in the polymer microstructure;

b and e are independently 0 or an integer from 1 to 3;

r is an integer from 1 to 5;

X is OM, wherein M is H, a metal cation, a non-metallic inorganic cation, an organic cation or a mixture thereof; or X is -E-T-(structure shown with R$^5_e$, Z$^3$, SO$_3$M groups, subscript p, T, Y')

wherein, Z$^3$ is a bond, CO, SO$_2$, a C$_1$-C$_{20}$ aliphatic radical, a C$_3$-C$_{40}$ aromatic radical, or a C$_4$-C$_{20}$ cycloaliphatic radical;

R$^5$ is independently C$_1$-C$_{10}$ alkyl, C$_3$-C$_{12}$ cycloalkyl, C$_6$-C$_{14}$ aryl, allyl, alkenyl, alkoxy, halo, nitro, perfluorinated alkyl, such as trifluoromethyl, or cyano;

e is independently 0 or an integer from 1 to 3;

p is an integer from 1 to 5;

T is independently O or S or a combination thereof;

Y' is independently a direct bond or O, S, (CH$_2$)$_r$, (CF$_2$)$_r$, C(CH$_3$)$_2$, C(CF$_3$)$_2$, or a combination thereof;

E is an amine-containing aromatic diradical, aliphatic diradical or cycloaliphatic diradical and the nitrogen is bound as a sulfonamide to the polymer backbone,

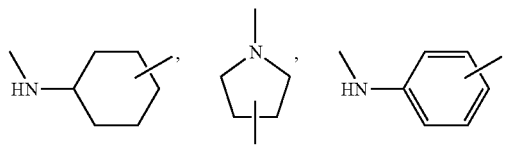

In one embodiment, a composition includes a polyarylether copolymer. The copolymer including a polyarylether backbone, and a sulfonated oligomeric group bonded to the polyarylether backbone. The polyarylether copolymer may have a ratio of a weight average molecular weight (Mw) to a number average molecular weight (Mn) that is greater than about 2. The polyarylether copolymer may have a ratio of a weight average molecular weight (Mw) to a number average molecular weight (Mn) that is less than about 4.5. In one embodiment, the ratio is in a range of from about 2 to about 3, from about 3 to about 4, or from about 4 to about 4.5. Controlling the ratio may affect properties and characteristics of the copolymer.

The polyarylether copolymer may have the number average molecular weight (Mn) greater than about 25,000. The number average molecular weight (Mn) may be less than about 200,000. The Mn may be in a range of from about 25,000 to about 55,000, from about 55,000 to about 100,000, from about 100,000 to about 150,000, or from about 150,000 to about 200,000. Controlling the ratio may affect properties and characteristics of the copolymer.

The polyarylether copolymer has an ion exchange capacity that is greater than about 0.1 milliequivalents per gram of dry polyarylether copolymer. The polyarylether copolymer has an ion exchange capacity that is less than about 4 milliequivalents per gram of dry polyarylether copolymer. The polyarylether copolymer has an ion exchange capacity in a range of from about 0.1 to about 1, from about 1 to about 2.0, from about 2.0 to about 3.0, or from about 3.0 to about 4.0 milliequivalents per gram of dry polyarylether copolymer.

The polyarylether copolymer may have a water uptake that is greater than about 10 percent at a temperature of about 100 degrees Celsius. The polyarylether copolymer may have a water uptake less than or equal to about 200 percent at a temperature of about 100 degrees Celsius. The polyarylether copolymer may have a water uptake in the range from about 10 percent to about 50 percent, from about 50 percent to about 100 percent, from about 100 percent to about 150 percent, or from about 150 percent to about 200 percent at a temperature of about 100 degrees Celsius.

In one embodiment, a method may include, but not limited to bonding a sulfonated oligomeric group to the polyarylether backbone to form a polyarylether copolymer. The polyarylether copolymer is used to form a membrane. The ion conductivity of the membrane is controlled by controlling the chain length of the sulfonated oligomeric group.

In one embodiment, an article may be formed from the composition. The article may be a membrane. The membrane may be a cation conducting membrane. The membrane may be suitable for use in a fuel cell device or a water purification device.

DETAILED DESCRIPTION

The invention includes embodiments that relate to a polyarylether composition. The invention includes embodiments that relate to a cation conducting membrane and method of making the cation conducting membrane for fuel cell or water purification applications.

In the embodiments, some of the terms used are defined as follows. Polyarylether copolymer is the sulfonated oligomeric group bonded to a polyarylether backbone chain. The polyarylether backbone chain includes one or more repeating units. Each repeating unit of the polyarylether backbone chain includes at least one ether or sulfide group (—O— or —S—); at least one aromatic group, including but not limited to phenylene, naphthylenes (such as 2,6-naphthylene), anthrylenes (such as 2,6-anthrylene) and phenanthrylenes (such as 2,7-phenanthrylene), naphthacenylenes and pyrenylenes; and may contain an activating group including ketone, sulfone, nitrile, aldehyde, nitro, or pyridine. The sulfonated oligomeric group includes one or more repeating units. Each repeating unit of the oligomeric group of the sulfonated oligomeric group includes any aromatic compounds containing two different but compatible polymerizable groups, such as halide and hydroxy functionalities, as well as an activating group such as listed above. An "oligomer" includes a sulfonate group to form the sulfonated oligomeric group. The term "bonded" includes two moieties coupled via one or more covalent bonds, ionic bonds, or coordinate bonds. Bonded as described herein means bond formation during the polymerization from the monomers or bond formation of two separate oligomeric or polymeric chains.

The composition includes a polyarylether copolymer. The copolymer includes a polyarylether backbone and a sulfonated oligomeric group bonded to the polyarylether backbone. The polyarylether copolymer has a chemical structure as shown in formula 1:

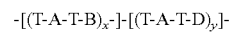

$$-[(T-A-T-B)_x-]-[(T-A-T-D)_y-]-$$ (Formula 1)

wherein,

T is independently O or S or a combination thereof,

-A- is

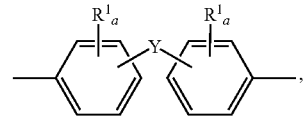

or a $C_1$-$C_{20}$ aliphatic diradical, or a $C_3$-$C_{40}$ aromatic diradical, or a $C_4$-$C_{20}$ cycloaliphatic diradical, or a $C_3$-$C_{40}$ heterocycle diradical, or

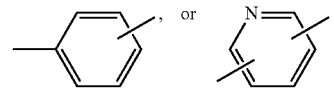

wherein Y is independently a direct bond or O, S, $(CH_2)_r$, $(CF_2)_r$, $C(CH_3)_2$, $C(CF_3)_2$, or a combination thereof;

$R^1$ is independently $C_1$-$C_{10}$ alkyl, $C_3$-$C_{12}$ cycloalkyl, $C_6$-$C_{14}$ aryl, allyl, alkenyl, alkoxy, halo, cyano, nitro, or perfluorinated alkyl, such as trifluoromethyl;

r is an integer from 1 to 5;

a is independently 0 or an integer from 1 to 4.

—B— is

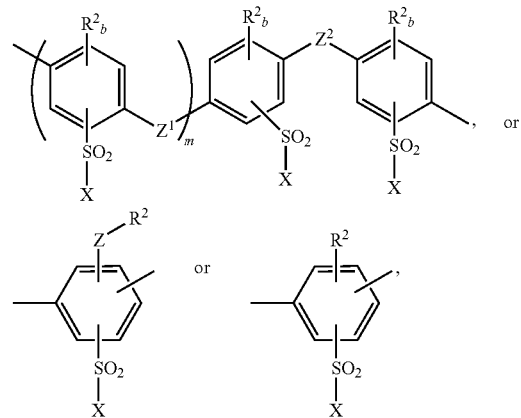

such as

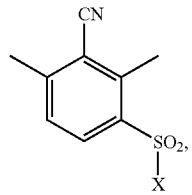

wherein, Z, $Z^1$, $Z^2$ is a direct bond, CO, $SO_2$, a $C_1$-$C_{20}$ aliphatic diradical, a $C_3$-$C_{40}$ aromatic diradical, or a $C_4$-$C_{20}$ cycloaliphatic diradical;

$R^2$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

m is independently 0 or an integer from 1 to 4;

b is independently 0 or an integer from 1 to 3;

X is OM, wherein M is H, a metal cation, a non-metallic inorganic cation, an organic cation or a mixture thereof; or X is

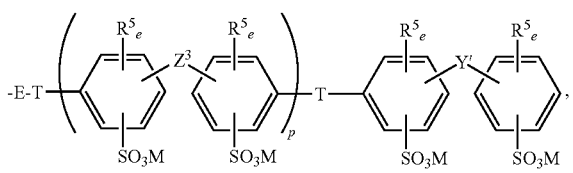

wherein, $Z^3$ is a bond, CO, $SO_2$, a $C_1$-$C_{20}$ aliphatic diradical, a $C_3$-$C_{40}$ aromatic diradical, or a $C_4$-$C_{20}$ cycloaliphatic diradical;

$R^5$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

e is independently 0 or an integer from 1 to 3;

T is independently O or S or a combination thereof;

p and r are integers from 1 to 5;

Y' is independently a direct bond or O, S, $(CH_2)_r$, $(CF_2)_r$, $C(CH_3)_2$, $C(CF_3)_2$, or a combination thereof;

E is an amine-containing aromatic diradical, aliphatic diradical or cycloaliphatic diradical and the nitrogen is bound as a sulfonamide to the polymer backbone,

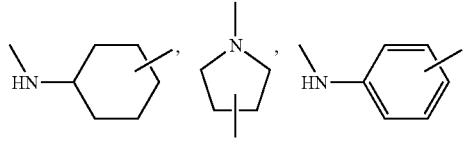

-D- is

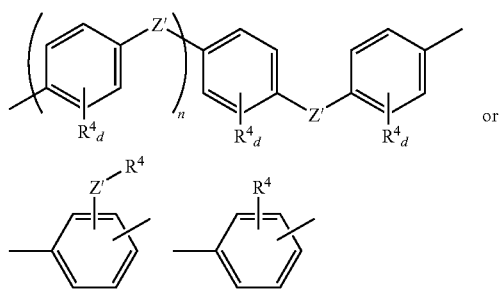

and wherein, $R^4$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

d and n are independently 0 or an integer from 1 to 4;

Z' is a direct bond, CO, $SO_2$, a $C_1$-$C_{20}$ aliphatic diradical, a $C_3$-$C_{40}$ aromatic diradical, or a $C_4$-$C_{20}$ cycloaliphatic diradical;

x and y are the repeat units may be from 0 to 500 with a random or block arrangement in the polymer microstructure.

One embodiment has a representative structure of the polyarylether copolymer which is also a sulfonated graft copolymer, either block or randomly distributed block lengths, as shown in formula 2.

(Formula 2)

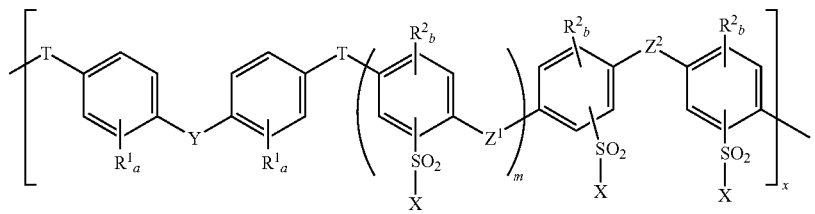

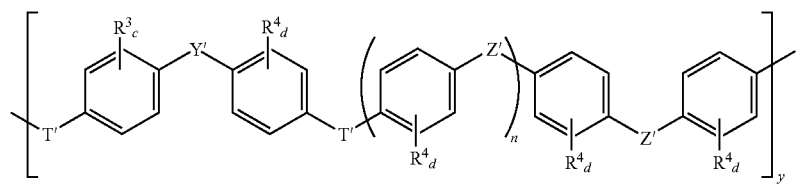

wherein,

T and T' are independently O or S or a combination thereof,

Also, Y and Y' are independently a direct bond or O, S, $(CH_2)_r$, $(CF_2)_r$, $C(CH_3)_2$, $C(CF_3)_2$, or a combination thereof;

$R^1$, $R^2$, $R^3$, and $R^4$ are independently $C_1$-$C_{10}$ alkyl, $C_3$-$C_{12}$ cycloalkyl, $C_6$-$C_{14}$ aryl, allyl, alkenyl, alkoxy, halo, perfluorinated alkyl, such as trifluoromethyl, or cyano;

$Z^1$, $Z^2$, or Z' is a bond, CO, $SO_2$, a $C_1$-$C_{20}$ aliphatic radical, a $C_3$-$C_{40}$ aromatic radical, or a $C_4$-$C_{20}$ cycloaliphatic radical;

a, c, e, m, and n are independently 0 or an integer from 1 to 4;

x and y are the repeat units may be from 0 to 500 with a random or block arrangement in the polymer microstructure;

b and e are independently 0 or an integer from 1 to 3;

r is an integer from 1 to 5;

X is OM, wherein M is H, a metal cation, a non-metallic inorganic cation, an organic cation or a mixture thereof; or X is

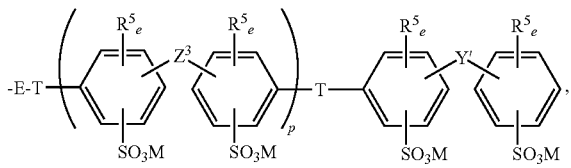

wherein, $Z^3$ is a bond, CO, $SO_2$, a $C_1$-$C_{20}$ aliphatic radical, a $C_3$-$C_{40}$ aromatic radical, or a $C_4$-$C_{20}$ cycloaliphatic radical;

$R^5$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;

e is independently 0 or an integer from 1 to 3;

p is an integer from 1 to 5;

T is independently O or S or a combination thereof;

Y' is independently a direct bond or O, S, $(CH_2)_r$, $(CF_2)_r$, $C(CH_3)_2$, $C(CF_3)_2$, or a combination thereof;

E is an amine-containing aromatic diradical, aliphatic diradical or cycloaliphatic diradical and the nitrogen is bound as a sulfonamide to the polymer backbone,

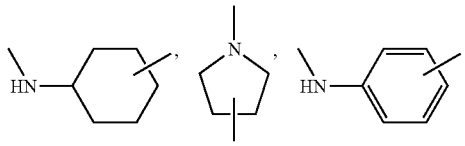

In one embodiment, the copolymer includes the polyarylether backbone and the sulfonated oligomeric group bonded to the polyarylether backbone. The polyarylether copolymer is a sulfonated polyaryletherketone. In one embodiment, the polyarylether copolymer is a sulfonated polyarylethersulfone bonded to a polyarylethersulfone. In one embodiment, the polyarylether copolymer is a polyaryletherketone chain. Selection of the polyarylether copolymer composition may affect one or more properties of the composition.

In one embodiment, the polyarylether backbone is sulfonated. In another embodiment, the polyarylether backbone is non-sulfonated. Where the polyarylether backbone is sulfonated, the degree of sulfonation may be controlled. Increasing the sulfonation level may affect the ion conductivity of a membrane formed from the material.

The polyarylether copolymer may have a ratio of a weight average molecular weight (Mw) to a number average molecular weight (Mn) that is greater than about 2. The polyarylether copolymer may have a ratio of a weight average molecular weight (Mw) to a number average molecular weight (Mn) that is less than about 4.5. In one embodiment, the ratio is in a range of from about 2 to about 3, from about 3 to about 4, or from about 4 to about 4.5. Controlling the ratio may affect properties and characteristics of the copolymer.

The polyarylether copolymer may have the number average molecular weight (Mn) greater than about 25,000. The number average molecular weight (Mn) may be less than about 200,000. The Mn may be in a range of from about 25,000 to about 55,000, from about 55,000 to about 100,000, from about 100,000 to about 150,000, or from about 150,000 to about 200,000. Controlling the ratio may affect properties and characteristics of the copolymer.

The polyarylether copolymer has an ion exchange capacity that is greater than about 0.1 milliequivalents per gram of dry polyarylether copolymer. The polyarylether copolymer has an ion exchange capacity that is less than about 4 milliequivalents per gram of dry polyarylether copolymer. The polyarylether copolymer has an ion exchange capacity in a range of from about 0.1 to about 1, from about 1 to about 2.0, from about 2.0 to about 3.0, or from about 3.0 to about 4.0 milliequivalents per gram of dry polyarylether copolymer.

The polyarylether copolymer may have a proton conductivity that is greater than about 0.01 siemens per centimeter at a temperature of about 80 degrees Celsius and a relative humidity of about 100 percent. The polyarylether copolymer has a proton conductivity that is less than about 1 siemens per centimeter at a temperature of about 80 degrees Celsius and a relative humidity of about 100 percent.

The polyarylether copolymer may have a water uptake that is greater than about 10 percent at a temperature of about 100 degrees Celsius. The polyarylether copolymer may have a water uptake less than or equal to about 200 percent at a temperature of about 100 degrees Celsius. The polyarylether copolymer may have a water uptake in the range from about 10 percent to about 50 percent, from about 50 percent to about 100 percent, from about 100 percent to about 150 percent, or from about 150 percent to about 200 percent at a temperature of about 100 degrees Celsius.

In one embodiment, the polyarylether backbone of the polyarylether copolymer may include one or more of polyethersulfone or polyaryletherketone, or a copolymer or derivative thereof. In one embodiment, the polyarylether copolymer includes a sulfonated oligomeric group that is a sulfonated polyaryletherketone, a sulfonated polyarylethersulfone, or a copolymer or derivative thereof.

An article may be formed from the composition. The article may be a membrane. The membrane may be a cation conducting membrane. The membrane may be suitable for use in, but not limited to, a fuel cell device, a water purification device, chlor-alkali process, cation exchange process, or any other application that require cation-conducting membrane in a process or device.

Bonding a sulfonated oligomeric group to the polyarylether backbone to form a polyarylether copolymer. The membrane may be formed from the composition including polyarylether copolymer. The chain length of the sulfonated oligomeric group can be controlled to affect or control the ion conductivity of the membrane.

In one embodiment, controlling the length of the sulfonated oligomeric group is determined by controlling the type or the number of repeating monomer unit(s). Examples of monomers that can be used to make the sulfonated oligomeric group, include aromatic compounds containing two different, but compatible, polymerizable groups, as well as an activating group. Suitable polymerizable groups may include halide and hydroxy functionalities. Suitable activating groups may include one or more of ketone, sulfone, nitrile, aldehyde, nitro, and pyridine. The length of the sulfonated oligomeric group can be greater than 1. The length of the sulfonated oligomeric group is less than about 25. The length of the sulfonated oligomeric group is in the range from 1 to about 5, from 5 to about 10, from 10 to about 15, from 15 to about 20, or from 20 to about 25. Controlling the chain length may affect properties and characteristics of the copolymer.

In one embodiment, the method includes forming the polyarylether copolymer, and controlling the ratio of a weight average molecular weight (Mw) to a number average molecular weight (Mn) by first synthesizing the oligomeric chain and then sulfonating it to form the sulfonated oligomeric chain that may be bonded to the polyarylether backbone. This process also imparts better solubility to the sulfonated oligomeric chains in water and polar aprotic solvents, such as dimethylsulfoxide, N,N-dimethylacetamide, and N-methylpyrrolidinone. The sulfonated oligomeric chain can bond to the polyarylether backbone by end-capping the sulfonated oligomeric group and copolymerizing with monomers to form the final polyarylether copolymer. The sulfonated oligomeric chain may bond to the polyarylether backbone. The bonding method may include first terminating the sulfonated oligomeric chain with a reactive group and then reacting the terminated sulfonated oligomeric chain with the already polymerized polyarylether backbone chain having a functionalized group. The terminated sulfonated oligomeric chain may react with the functionalized group of the polymerized polyarylether backbone to form the final polyarylether copolymer. Since transetherification may occur during reaction, measures may be taken to prevent sequence randomization through interchange reactions, such as using lower polymerization temperatures (<150 degrees Celsius) and synthesizing the less reactive blocks first.

The compositions described herein may be varied in one or more ways. The following methodologies are examples of modifications that may be made to the polyarylether copolymers described. Incorporation of fluorinated functional groups (e.g. trifluoromethyl, pentafluoroethyl, other perfluoroalkyl, fluoro- or polyfluoroalkyl, trifluorovinyl ethers, etc.) may increase the hydrophobicity of the polymer, or of its hydrophobic component, enhancing phase separation, and/or increasing mechanical properties such as toughness. The polymers may be crosslinked during, or after, film formation by a variety of techniques. Such techniques may include formation of sulfonamides or sulfonimides; reaction with diisocyanates to form urethanes or ureas; radical coupling; cycloaddition, for example of trifluorovinyl ethers to form perfluorocyclobutane crosslinkers; alkylation to form onium, imidazolium, benzimidazolium, or other heterocyclic atom containing salts; maleimide reactions; acetylene reactions; benzocyclobutene reactions; phthalonitrile reactions; 3+2 cycloaddition reactions (i.e., "click chemistry"); oxidative or reductive coupling; or others. The technique may be selected with reference to the desired characteristics of the reaction product. In addition to the arylsulfonic acids incorporated in these polymers, stronger organic acids could also be incorporated. For example, perfluorophenylsulfonic acids may be incorporated as pendant functionalities, or as part of the main polymer chain. Perfluoroalkyl sulfonic acids may also be incorporated as pendant functionalities. The incorporation of more acidic functionalities may affect the proton conductivity of the polymers.

These polymers may be used in combination with other polymers in blends or alloys. Impact modifiers, plasticizers, and other additives may control mechanical and processing properties. Further, incorporation as blocks in multi-block or segmented polymers is anticipated. Block length, ratio of blocks, and molecular weights of the block copolymers may be varied to optimize conductivity and water swellability. Fillers may be used in combination with these polymers, including heteropolyacids, zeolites, clays, and nanoparticles of various types. Other additives such as corrosion inhibitors, antioxidants, or other stabilizers may also be used in combination with these polymers.

EXAMPLES

All reagents may be purchased from Aldrich, Inc. unless otherwise indicated.

Example 1

Synthesis of Potassium Salt

An amount of 4-Fluoro-4'hydroxybenzophenone (40.18 g, 185.83 mmol) is dissolved in 300 mL methanol. Potassium hydroxide (KOH) (10.422 g, 185.74 mmol) is dissolved in 100 mL methanol. The KOH solution is poured into the solution of 4-fluoro-4'-hydroxybenzophenone with stirring, resulting in the immediate formation of a homogeneous dark amber solution. The solution is stirred at room temperature for 1-2 hours, then the methanol is removed by rotary evaporation. Diethyl ether is added to "powderize" the bright yellow product, which is then isolated on a Buchner funnel and washed with more diethyl ether to remove any residual starting material. The product is dried under vacuum at 100 degrees Celsius and is ground to a fine powder by mortar and pestle. The powder is stirred in diethyl ether, isolated, and dried under vacuum at 100° C. Yield: 42 g (89%). $^1$H NMR (DMSO-$d_6$): δ 6.05 (d, 2H), 7.25 (t, 2H), 7.35 (d, 2H), 7.55 (dd, 2H). The powder includes potassium salt of 4-fluoro-4'-hydroxybenzophenone (KFHBP).

Example 2

Synthesis of Oligomer

Self-reactivity of the potassium salt of 4-fluoro-4'-hydroxybenzophenone (KFHBP) at 100° C. is low. 4-Fluorobenzophenone can be used to initiate oligomer chain growth. 4-Fluorobenzophenone (2.624 g, 13.1 mmol) and KFHBP (10 g, 39.3 mmol) are transferred into a 250 mL 3-neck flask equipped with mechanical stirrer and nitrogen inlet/outlet. Anhydrous dimethylsulfoxide (25 mL) is added to dissolve, and the mixture is stirred at 100 degrees Celsius for 32 hours. Product solubility in DMSO is limited to trimers and dimers. The mixture is diluted with 25 mL DMSO and then poured into 300 mL deionized water. The off-white solid is washed with deionized water, is stirred in MeOH, and is isolated and dried at 100 degrees Celsius. Yield: 7.95 g (77%). The oligomer includes polyetherketone (PEK) oligomer.

Example 3

Sulfonation of Oligomer

The oligomer of Example 2 is produced. 1.1 equivalents $SO_3$ for each equivalent of sulfonic acid desired is used. For n=3 oligomer containing 8 phenyl rings to be sulfonated, at least 8.8 equivalents SO$_3$ per equivalent of starting material is used. The n=3 oligomer (7.95 g, 0.01 mol) is transferred into a 250 mL 3-neck flask equipped with mechanical stirrer, condenser, and nitrogen inlet/outlet. Fuming sulfuric acid (30% SO$_3$, 12.5 mL) is added to the oligomer in the flask. A slight exotherm is observed. The viscous dark red-brown mixture is stirred at 115 degrees Celsius for 9 hours. After cooling to room temperature, the thick mixture is added to ice-cold deionized water (50 mL), resulting in a reddish brown solution. NaCl is added to saturate the solution, which is then placed in the freezer. A sticky material precipitated at the bottom of the flask, and the solution is decanted. The material is re-dissolved in a minimal amount of water and neutralized to pH 7 with 50% NaOH solution. NaCl is added to salt out the product. The initially sticky product is isolated as a powder after stirring in isopropanol. This powder still contained sodium sulfate and chloride salts; therefore, DMSO (100 mL) is used to extract the product, which is precipitated in isopropanol. The resulting sticky product is re-dissolved in water (25 mL) and precipitated in isopropanol. The sticky product chunks are ground in isopropanol in a mortar to displace DMSO and water, and the mixture is filtered to yield an off-white powder, which is washed several times with isopropanol. The product is dried under vacuum at 100° C. Yield: 7.16 g (50%). $^1$H NMR (DMSO-d$_6$): δ 8.25 (m), 8.00 (s), 7.92 (d), 7.84 (m), 7.78 (m), 7.70 (d), 7.58 (t), 7.43 (m), 7.16 (m), 7.04 (m). The reaction product includes sulfonated PEK oligomer.

Example 4

Synthesis of Amine-Terminated Sulfonated PEK

From Example 3, an amount of sulfonated PEK oligomer (n=3) (12 g, 9.97 mmol), 4-aminophenol (1.36 g, 12.5 mmol), and potassium carbonate (2.066 g, 15.0 mmol) are transferred into a 250 mL 3-neck flask equipped with mechanical stirrer, nitrogen inlet/outlet, and Dean-Stark trap/condenser. Anhydrous DMSO (30 mL) is added, and the reagents dissolved with heating. Toluene (10 mL, dried over molecular sieves) is added to azeotrope off water produced. The mixture is stirred at 145° C. for 7 hours. The mixture is filtered through Celite over a coarse glass frit. The solution is precipitated into vigorously stirring acetone, isolated, and then ground in acetone by mortar and pestle until a yellow-brown powder is obtained. The powder is dried under vacuum at 100° C. Yield: 10.4 g (81%) $^1$H NMR(DMSO-d$_6$): δ 5.05 (s, NH$_2$), 6.63 (d, 2H), 6.80 (d, 2H), 7.0-8.4 (m, sulfonated PEK). The reaction product includes amine-terminated sulfonated PEK oligomer.

Example 5

Synthesis of Amine-Terminated Sulfonated Polyethersulfone (PES)

Sulfonated PES oligomer (n=9) (11.84 g, 3.04 mmol), 4-aminophenol (0.415 g, 3.8 mmol), and potassium carbonate (0.63 g, 4.6 mmol) are transferred into a 250 mL 3-neck flask equipped with mechanical stirrer, nitrogen inlet/outlet, and Dean-Stark trap/condenser. Anhydrous DMSO (25 mL) is added, and the reagents dissolved with heating. Toluene (8 mL, dried over molecular sieves) is added to azeotrope off water produced. The mixture is stirred at 145 degrees Celsius for 8 hours. The mixture is filtered through Celite over a coarse glass frit, and the Celite is washed with DMSO (2×10 mL). The solution is precipitated into acetone (500 mL) in a blender, isolated wet, and stirred vigorously in the blender with more acetone. The powder is isolated by filtration, washed with more acetone, and dried under vacuum at 100 degrees Celsius. Yield: 10.9 g (90%). $^1$H NMR(DMSO-d$_6$): δ 5.08 (s, NH$_2$), 6.60 (d, 2H), 6.74 (d, 2H), 6.8-8.4 (m, sulfonated PES). The reaction product includes amine-terminated sulfonated polyethersulfone (PES).

Example 6

Synthesis of Random 30% Sulfonated PES

6F-Bisphenol A (13.271 g, 39.5 mmol) and potassium carbonate (8.183 g, 59.2 mmol) are transferred into a 500 mL 3-neck flask equipped with mechanical stirrer, nitrogen inlet/outlet, and Dean-Stark trap/condenser. Anhydrous DMSO (40 mL) and toluene (20 mL, dried over molecular sieves) are added. The mixture is stirred at 145° C. for 2 hours. 3,3'-Disulfonated-4,4'-difluorobenzophenone (5 g, 11.8 mmol) and 4,4'-difluorodiphenylsulfone (7.024 g, 27.6 mmol) are added and washed in with more anhydrous DMSO (20 mL) and toluene (5 mL). The mixture is stirred at 145 degrees Celsius for 6 hours. The viscous mixture is diluted with DMSO (60 mL) and precipitated into isopropanol in a blender in portions (2×500 mL). The polymer is isolated by filtration and dried briefly under vacuum at 100 degrees Celsius. The polymer is washed with deionized water (4×500 mL) in the blender, then isolated and dried under vacuum at 100 degrees Celsius. Yield: 21.9 g. The reaction product includes random 30% sulfonated PES.

Example 7

Synthesis of Block 30% Sulfonated PES

An amount of 6F-Bisphenol A (4.379 g, 13.0 mmol), 3,3'-disulfonated-4,4'-difluorobenzophenone (5 g, 11.8 mmol), and potassium carbonate (8.183 g, 59.2 mmol) are transferred into a 500 mL 3-neck flask equipped with mechanical stirrer, nitrogen inlet/outlet, and Dean-Stark trap/condenser. Anhydrous DMSO (40 mL) and toluene (15 mL, dried over molecular sieves) are added. The mixture is stirred at 145 degrees Celsius for 7 hours. More 6F-bisphenol A (8.892 g, 26.4 mmol) and 4,4'-difluorodiphenylsulfone (7.024 g, 27.6 mmol) are added and washed in with more anhydrous DMSO (20 mL) and toluene (15 mL). The mixture is stirred at 145 degrees Celsius for 2 hours. The mixture is diluted with anhydrous DMSO (60 mL) and stirred at 145 degrees Celsius for another hour. The viscous mixture is diluted with DMSO (10 mL) and precipitated into isopropanol in a blender in portions (2×500 mL). The polymer is isolated by filtration and dried briefly under vacuum at 100 degrees Celsius. The polymer is washed with deionized water (4×500 mL) in the blender, then isolated and dried under vacuum at 100 degrees Celsius. Yield: 21.5 g. The reaction product includes block 30% sulfonated PES with a Degree of polymerization=10.

Example 8

Synthesis of Functionalized PES

Sulfonated PES (sodium salt form) is ground to a fine powder and stirred in 1M sulfuric acid at room temperature for 24 hours to acidify. The polymer is isolated by filtration and washed with deionized water until the washings are pH neutral. The polymer is dried under vacuum at 100° C. The acidified polymer (15 g) is transferred into a 500 mL 3-neck flask equipped with mechanical stirrer, nitrogen inlet, condenser, and outlet connected to an acid trap (20% NaOH in water). Thionyl chloride (100 mL) is added, along with some DMF (5 mL). The homogeneous yellow solution is stirred at 85 degrees Celsius for 12 hours. The solution is added dropwise to rapidly stirring ice-cold water, precipitating a rubbery polymer. The polymer is isolated and washed with water until about pH 2. Then the polymer is washed with water in a blender until the washing are pH neutral. The polymer is dried under vacuum at 100 degrees Celsius. Yield: 15.1 g (99%). The reaction product includes sulfonyl chloride functionalized PES.

Example 9

Synthesis of Graft Copolymer

Sulfonyl chloride functionalized PES (1 g, 1.67 mmol) is dissolved in sulfolane (25 mL) and mechanically stirred at 80° C. until the polymer dissolved. Amine-terminated sulfonated PES oligomer (n=9) (2 g, 0.5 mmol, 1 graft per disulfonated repeat unit) is suspended in sulfolane (20 mL), and deionized water (1.5 mL) is added until the oligomer dissolved. Triethylamine (0.082 g, 0.81 mmol) is added to the amine-terminated oligomer solution, which is then added dropwise to the vigorously stirring solution of sulfonyl chloride functionalized PES. The cloudy light brown mixture is stirred at 80 degrees Celsius for 16 hours. The product is precipitated into isopropanol (200 mL), isolated, and dried under vacuum for 1 hour. The powder is washed with water and then swollen in DMSO (14 mL). NaOH (50%) (0.6 g, 7.5 mmol) is added, and the mixture is heated briefly and then stirred at room temperature for 30 minutes. The product is precipitated into isopropanol (150 mL), isolated, and briefly dried under vacuum. The product is washed with deionized water until the washings are pH neutral and then dried under vacuum at 100 degrees Celsius. Yield: 0.83 g. Reaction product includes a graft copolymer via sulfonamide linkages.

Example 10

Membrane Preparation

The salt form of the graft copolymer produced in Example 9 is dissolved in a polar aprotic solvent (DMSO) and then filtered through CELITE over a coarse glass frit. The polymer solution is cast onto a glass plate from DMSO solution (10-25 wt %) using a doctor blade (10-15 mil). Large films (12×12 cm$^2$, 15×15 cm$^2$) are cast using an ERICHSEN COATMASTER 509 MC-1 film coater. The films are dried at 50 degrees Celsius for 4 hours and then under vacuum at 100° C. for 24 hours. Acidification of the films is achieved by soaking in 1M H$_2$SO$_4$ at room temperature for 24 hours, followed by washing in deionized water to remove residual acid. The films are then dried under vacuum at 100 degrees Celsius for 24 hours to form a membrane. Additional membranes are produced and formed in the same manner, except the compositions are listed in Table 1, samples 1-6.

Example 11

Membrane Proton Conductivity Measurement

The proton conductivity of membranes formed in Example 10 is determined by 4-electrode AC impedance measurements at various temperatures and relative humidities. Measurements used a Parstat impedance analyzer with PowerSine software, using signal amplitude that ranged from 5 to 50 mV and frequencies ranging from 2 Hz to 2 MHz. The sample dimensions varied between samples, with a typical sample being 1.5 cm×2.5 cm and having a thicknesses ranging from 20 to 100 μm. Average membrane thickness is in a range of from about 25 micrometers to about 50 micrometers.

Membrane water uptake is determined using a thin film sample with a nominal area of ca. 20×20 mm$^2$. The sample film is first dried in a vacuum oven at 110 degrees Celsius for 2 hours and then immediately weighed with a microbalance to obtain its dry weight. The film is then soaked for 2 hours in deionized water at various temperatures (room temperature, 60 degrees Celsius, 90 degrees Celsius, and 100 degrees Celsius.) After soaking, the film is taken out, quickly patted dry to remove any surface water droplets, and then immediately weighed to obtain the sample weight after soaking. Water uptake is expressed as the percent increase in weight of the sample relative to the weight of the vacuum dried sample and is calculated according to the following equation:

Water Uptake=[weight(wet)−weight(dry)]/[weight (dry)]×100%

In Table 1, number average molecular weight (Mn) and weight average molecular weight (Mw) and the polydispersity index (PDI) of different polymer samples are described. In Table 2, the ion exchange capacity (IEC) and conductivities at 80 degrees Celsius of the polymer samples are described. In Table 3, the percent water uptakes of the polymer samples are described at different temperatures.

TABLE 1

Sample description and Mn, Mw and PDI of the polymers

| Sample no. | Graft Type | Chain Length | Mw | Mn | PDI |
|---|---|---|---|---|---|
| 1 | Random | 3 | 97000 | 27000 | 3.6 |
| 2 | Random | 9 | 112000 | 49000 | 2.3 |
| 3 | Random | 20 | 96000 | 38000 | 2.6 |
| 4 | Block | 3 | 120000 | 28000 | 4.2 |
| 5 | Block | 9 | 145000 | 50000 | 2.9 |
| 6 | Block | 20 | 147000 | 49000 | 3.0 |

TABLE 2

Ion exchange capacity and conductivities at 80 degrees C. of the polymer samples

| Sample no. | IEC (meq/g) | 80° C. Proton Conductivities (S/cm) at Specific Relative Humidities | | | |
|---|---|---|---|---|---|
| | | 100% | 75% | 50% | 25% |
| 1 | 1.2 | 0.03730 | 0.01420 | 0.00060 | 0.00002 |
| 2 | 1.1 | 0.04370 | 0.01330 | 0.00030 | 0.00004 |
| 3 | 1.3 | 0.05250 | 0.00900 | 0.00240 | 0.00070 |
| 4 | 0.8 | 0.05880 | 0.01720 | 0.00310 | 0.00090 |
| 5 | 0.8 | 0.05120 | 0.02090 | 0.00290 | 0.00100 |
| 6 | 0.8 | 0.06420 | 0.01880 | 0.00310 | 0.00080 |

TABLE 3

Water uptake property of the polymer samples:

| Sample no. | Water Uptake (%) at Specific Temperatures | | | |
|---|---|---|---|---|
| | 30° C. | 60° C. | 85° C. | 100° C. |
| 1 | 28 | 29 | 30 | 34 |
| 2 | 27 | 34 | 38 | 46 |
| 3 | 40 | 45 | 52 | 59 |
| 4 | 32 | 42 | 58 | 78 |

TABLE 3-continued

Water uptake property of the polymer samples:

| Sample no. | Water Uptake (%) at Specific Temperatures | | | |
|---|---|---|---|---|
| | 30° C. | 60° C. | 85° C. | 100° C. |
| 5 | 25 | 32 | 44 | 54 |
| 6 | 27 | 29 | 34 | 45 |

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In describing the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Thus for example finely divided solids such as pigments may be dispersed into the reaction mixture, before during or after reaction to produce a reaction product composition that additionally comprises the non-reactive component, e.g. the pigment. Additional reactive components may also be added; such components may react with the initial reactants or they may react with the reaction product; the phrase "reaction product" is intended to include those possibilities as well as including the addition of non-reactive components.

The embodiments described herein are examples of composition, articles, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A composition, comprising a polyarylether copolymer of formula I

-[(T-A-T-B)$_x$-]-[(T-A-T-D)$_y$-]-  (Formula 1)

wherein
T is O,
A- is

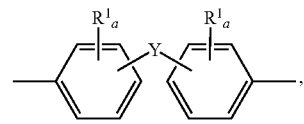

Y is $(CH_2)_r$, $(CF_2)_r$, $C(CH_3)_2$, $C(CF_3)_2$, or a combination thereof;
$R^1$ is independently $C_1$-$C_{10}$ alkyl, $C_3$-$C_{12}$ cycloalkyl, $C_6$-$C_{14}$ aryl, allyl, alkenyl, alkoxy, halo, cyano, nitro, or perfluorinated alkyl, such as trifluoromethyl;
r is an integer from 1 to 5;
a is 0,
B— is

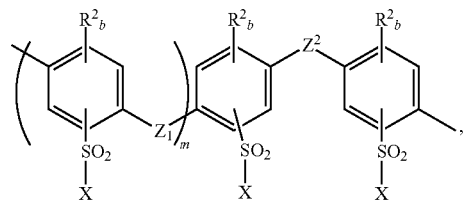

Z, $Z^1$, and $Z^2$ is CO;
$R^2$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;
m is independently 0 or an integer from 1 to 4;
b is 0;

X is

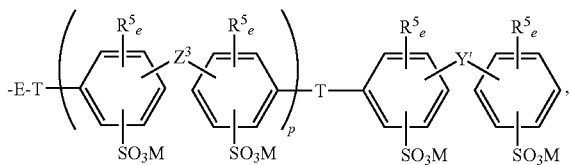

$Z^3$ is CO;
$R^5$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;
e is 0;
T is O;
p and r are integers from 1 to 5;
Y' is O;
E is an amine-containing aromatic diradical,
D- is

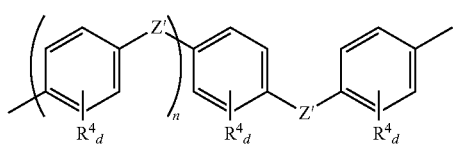

$R^4$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;
d is 0 and n is independently 0 or an integer from 1 to 4;
Z' is $SO_2$;
x and y are the repeat units may be from 0 to 500 with a random or block arrangement in the polymer microstructure.

2. The composition as defined in claim 1, wherein the polyarylether copolymer has a chemical structure as shown in formula 2:

$R^1$, $R^2$, $R^3$, and $R^4$ are independently $C_1$-$C_{10}$ alkyl, $C_3$-$C_{12}$ cycloalkyl, $C_6$-$C_{14}$ aryl, allyl, alkenyl, alkoxy, halo, perfluorinated alkyl, such as trifluoromethyl, or cyano;
$Z^1$ and $Z^2$ are CO and Z' is $SO_2$;
a, c, e, m, and n are independently 0 or an integer from 1 to 4;
x and y are the repeat units may be from 0 to 500 with a random or block arrangement in the polymer microstructure;
b and e are independently 0 or an integer from 1 to 3;
r is an integer from 1 to 5;
X is

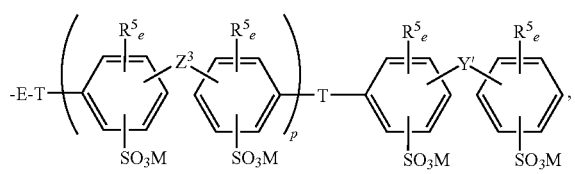

$Z^3$ is CO;
$R^5$ is independently $C_1$-$C_{10}$ alkyl, $C_3$-$C_{12}$ cycloalkyl, $C_6$-$C_{14}$ aryl, allyl, alkenyl, alkoxy, halo, nitro, perfluorinated alkyl, such as trifluoromethyl, or cyano;
e is 0;
p is an integer from 1 to 5;
T is independently O or S or a combination thereof;
Y' is O;
E is an amine-containing aromatic diradical.

3. The composition as defined in claim 1, wherein the polyarylether copolymer is a random copolymer, or block copolymer, or its mixture thereof.

4. The composition as defined in claim 1, wherein the polyarylether copolymer is a sulfonated polyaryletherketone, or a sulfonated polyarylethersulfone bonded to a polyarylethersulfone, or a sulfonated polyaryletherketone bonded to a polyarylethersulfone, or a polyaryletherketone chain.

5. The composition as defined in claim 1, wherein the polyarylether backbone is not sulfonated.

(Formula 2)

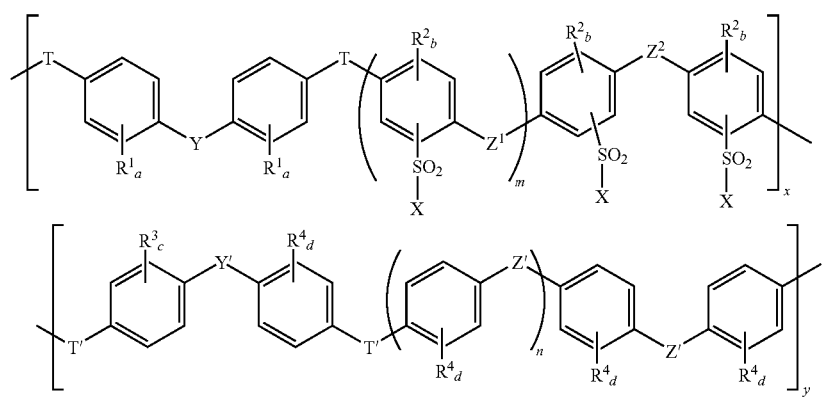

wherein
T and T' are O,
Y and Y' are $(CH_2)_r$, $(CF_2)_r$, $C(CH_3)_2$, $C(CF_3)_2$, or a combination thereof;

6. The composition as defined in claim 1, wherein the polyarylether backbone is sulfonated.

7. The composition as defined in claim 1, wherein the polyarylether copolymer has a ratio of a weight average molecular weight (Mw) to a number average molecular weight (Mn) is in a range of from about 2.00 to about 4.5, wherein the number average molecular weight (Mn) is in a range of from about 25,000 to about 200,000.

8. The composition as defined in claim 1, wherein the polyarylether copolymer has an ion exchange capacity in a range of from about 0.1 to about 4.0 milliequivalents per gram of dry polyarylether copolymer.

9. The composition as defined in claim 1, wherein the polyarylether copolymer has an proton conductivity in a range of from about 0.01 to about 1 siemens per centimeter at a temperature of about 80 degrees Celsius and a relative humidity of about 100 percent.

10. The composition as defined in claim 1, wherein the polyarylether copolymer has a water uptake in a range of from about 30 percent to about 200 percent at a temperature of about 100 degrees Celsius.

11. The composition as defined in claim 1, wherein the polyarylether backbone comprises a polyethersulfone, a polyaryletherketone, copolymers or derivatives thereof.

12. The composition as defined in claim 1, wherein the sulfonated oligomeric group comprises a sulfonated polyaryletherketone, or a sulfonated polyarylethersulfone, copolymers or derivatives thereof.

13. An article formed from the composition as defined in claim 1, is a cation conducting membrane for fuel cells.

14. A composition comprising a polyarylether copolymer of formula 1

-[(T-A-T-B)$_x$-]-[(T-A-T-D)$_y$]-  (Formula 1)

wherein
T is O,
A- is

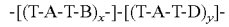

Y is (CH$_2$)$_r$, (CF$_2$)$_r$, C(CH$_3$)$_2$, C(CF$_3$)$_2$, or a combination thereof;
R$^1$ is independently C$_1$-C$_{10}$ alkyl, C$_3$-C$_{12}$ cycloalkyl, C$_6$-C$_{14}$ aryl, allyl, alkenyl, alkoxy, halo, cyano, nitro, or perfluorinated alkyl, such as trifluoromethyl;
r is an integer from 1 to 5;
a is 0,
B— is

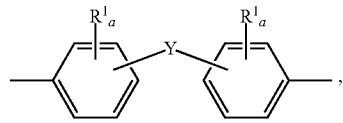

Z, Z$^1$, and Z$^2$ is CO;
R$^2$ is independently C$_1$-C$_{10}$ alkyl, C$_3$-C$_{12}$ cycloalkyl, C$_6$-C$_{14}$ aryl, allyl, alkenyl, alkoxy, halo, nitro, perfluorinated alkyl, such as trifluoromethyl, or cyano;
m is independently 0 or an integer from 1 to 4;
b is 0;

X is

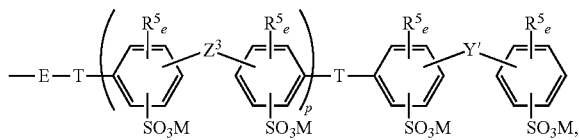

Z$^3$ is CO;
R$^5$ is independently C$_1$-C$_{10}$ alkyl, C$_3$-C$_{12}$ cycloalkyl, C$_6$-C$_{14}$ aryl, allyl, alkenyl, alkoxy, halo, nitro, perfluorinated alkyl, such as trifluoromethyl, or cyano;
e is 0;
T is O;
p and r are integers from 1 to 5;
Y' is O;
E is an amine-containing aromatic diradical,
D- is

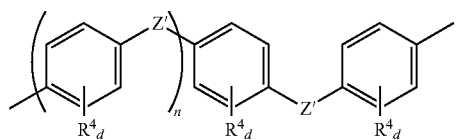

R$^4$ is independently C$_1$-C$_{10}$ alkyl, C$_3$-C$_{12}$ cycloalkyl, C$_6$-C$_{14}$ aryl, allyl, alkenyl, alkoxy, halo, nitro, perfluorinated alkyl, such as trifluoromethyl, or cyano;
d is 0 and n is independently 0 or an integer from 1 to 4;
Z' is SO$_2$;
x and y are the repeat units may be from 0 to 500 with a random or block arrangement in the polymer microstructure,
wherein the polyarylether copolymer has a ratio of a weight average molecular weight (Mw) to a number average molecular weight (Mn) in a range of from about 2.00 to about 4.5 wherein the number average molecular weight (Mn) is in a range of from about 25,000 and about 200,000, and
ion exchange capacity in a range of from about 0.1 to about 4.0 milliequivalents per gram of dry polyarylether copolymer, and
a water uptake in a range from about 30 percent to about 200 percent at a temperature of about 100 degrees Celsius.

15. The composition as defined in claim 14, wherein the polyarylether copolymer has an proton conductivity in a range of from about 0.01 to about 1 siemens per centimeter at a temperature of about 80 degrees Celsius and a relative humidity of about 100 percent.

16. The composition as defined in claim 14, wherein the polyarylether copolymer is a sulfonated polyaryletherketone, or a sulfonated polyarylethersulfone bonded to a polyarylethersulfone, or a polyaryletherketone chain.

17. The composition as defined in claim 14, wherein the polyarylether backbone comprises a polyethersulfone, or a polyaryletherketone or copolymers or derivatives thereof.

18. The composition as defined in claim 14, wherein the sulfonated oligomeric group comprises a sulfonated polyaryletherketone, or a sulfonated polyarylethersulfone, or copolymers or derivatives thereof.

19. An article formed from the composition as defined in claim 14, comprises a cation conducting membrane for a fuel cell device or water purification device.

20. An article formed from a composition as defined in claim 1.

21. The article as defined in claim 20, is a cation conducting membrane.

22. A fuel cell device comprising the cation conducting membrane, as defined in claim 21.

23. A water purification device comprising the cation conducting membrane, as defined in claim 21.

* * * * *